(12) United States Patent
Saffran

(10) Patent No.: US 10,249,323 B2
(45) Date of Patent: Apr. 2, 2019

(54) VOICE ACTIVITY DETECTION FOR COMMUNICATION HEADSET

(71) Applicant: BOSE CORPORATION, Framingham, MA (US)

(72) Inventor: Richard E. Saffran, Southborough, MA (US)

(73) Assignee: BOSE CORPORATION, Framingham, MA (US)

( * ) Notice: Subject to any disclaimer, the term of this patent is extended or adjusted under 35 U.S.C. 154(b) by 0 days.

(21) Appl. No.: 15/609,297

(22) Filed: May 31, 2017

(65) Prior Publication Data

US 2018/0350394 A1  Dec. 6, 2018

(51) Int. Cl.
| | |
|---|---|
| *G10L 15/00* | (2013.01) |
| *G10L 25/78* | (2013.01) |
| *G10L 25/51* | (2013.01) |
| *H04R 3/04* | (2006.01) |
| *H04R 1/40* | (2006.01) |
| *H04R 3/00* | (2006.01) |
| *G10L 15/22* | (2006.01) |
| *G10L 15/26* | (2006.01) |
| *G10L 15/30* | (2013.01) |

(52) U.S. Cl.
CPC .............. *G10L 25/78* (2013.01); *G10L 15/22* (2013.01); *G10L 25/51* (2013.01); *H04R 1/406* (2013.01); *H04R 3/005* (2013.01); *H04R 3/04* (2013.01); *G10L 15/265* (2013.01); *G10L 15/30* (2013.01); *G10L 2025/783* (2013.01)

(58) Field of Classification Search
CPC combination set(s) only.
See application file for complete search history.

(56) References Cited

U.S. PATENT DOCUMENTS

| | | |
|---|---|---|
| 6,339,706 B1 | 1/2002 | Tillgren et al. |
| 6,363,349 B1 | 3/2002 | Urs et al. |
| 6,453,291 B1 | 9/2002 | Ashley |
| 7,103,550 B2 | 9/2006 | Gallagher et al. |
| 7,412,070 B2 | 8/2008 | Kleinschmidt et al. |

(Continued)

FOREIGN PATENT DOCUMENTS

| | | |
|---|---|---|
| EP | 2884763 A1 | 6/2015 |
| EP | 2914016 A1 | 9/2015 |

(Continued)

OTHER PUBLICATIONS

Gillett, P.W. "Head Mounted Microphone Arrays" (2009), Blacksburg, VA. Retrieved from the Internet: https://vtechworks.lib.vt.edu/bitstream/handle/10919/28867/GillettDissertation2.pdf?sequence=1 &isAllowed=y.

(Continued)

*Primary Examiner* — Vu B Hang
(74) *Attorney, Agent, or Firm* — Lando & Anastasi, LLP

(57) ABSTRACT

A headset and a method for determining that a headset user is speaking, includes receiving a first signal from a first microphone and receiving a second signal from a second microphone. A principal signal is provided from a sum of the first and second signals. A reference signal is provided from a difference between the first and second signals. A rate of change of at least one of the principal signal or the reference signal is limited by a time constant. The principal signal and the reference signal are compared, and an indication that the user is speaking is selectively made based at least in part upon the comparison.

20 Claims, 3 Drawing Sheets

(56) References Cited

U.S. PATENT DOCUMENTS

| | | |
|---|---|---|
| 8,184,822 B2 | 5/2012 | Carreras et al. |
| 8,611,560 B2 | 12/2013 | Goldstein et al. |
| 8,620,650 B2 | 12/2013 | Walters et al. |
| 8,625,819 B2 | 1/2014 | Goldstein et al. |
| 8,626,246 B2 | 1/2014 | Shostak |
| 8,798,283 B2 | 8/2014 | Gauger, Jr. et al. |
| 8,805,692 B2 | 8/2014 | Goldstein |
| 8,880,396 B1 | 11/2014 | Laroche et al. |
| 9,066,167 B2 | 6/2015 | Goldstein et al. |
| 9,076,447 B2 | 7/2015 | Nandy et al. |
| 9,204,214 B2 | 12/2015 | Usher et al. |
| 9,401,158 B1 | 7/2016 | Yen et al. |
| 9,843,861 B1 | 12/2017 | Termeulen |
| 2005/0152559 A1 | 7/2005 | Gierl et al. |
| 2007/0172079 A1 | 7/2007 | Christoph |
| 2008/0031475 A1 | 2/2008 | Goldstein |
| 2009/0304188 A1 | 12/2009 | Mejia et al. |
| 2010/0028134 A1 | 2/2010 | Slapak et al. |
| 2010/0086122 A1 | 4/2010 | Takada |
| 2011/0211706 A1 | 9/2011 | Tanaka et al. |
| 2012/0020480 A1 | 1/2012 | Visser et al. |
| 2012/0057722 A1 | 3/2012 | Osako et al. |
| 2014/0081644 A1 | 3/2014 | Usher et al. |
| 2014/0093091 A1 | 4/2014 | Dusan et al. |
| 2014/0095157 A1 | 4/2014 | Usher et al. |
| 2014/0119557 A1 | 5/2014 | Goldstein |
| 2014/0119558 A1 | 5/2014 | Goldstein |
| 2014/0119559 A1 | 5/2014 | Goldstein |
| 2014/0119574 A1 | 5/2014 | Goldstein |
| 2014/0122073 A1 | 5/2014 | Goldstein |
| 2014/0122092 A1 | 5/2014 | Goldstein |
| 2014/0123008 A1 | 5/2014 | Goldstein |
| 2014/0123009 A1 | 5/2014 | Goldstein |
| 2014/0123010 A1 | 5/2014 | Goldstein |
| 2014/0244273 A1 | 8/2014 | Laroche et al. |
| 2014/0268016 A1 | 9/2014 | Chow et al. |
| 2014/0278393 A1 | 9/2014 | Ivanov et al. |
| 2014/0350943 A1 | 11/2014 | Goldstein |
| 2015/0112689 A1 | 4/2015 | Nandy et al. |
| 2015/0139428 A1 | 5/2015 | Reining et al. |
| 2015/0230026 A1 | 8/2015 | Eichfeld et al. |
| 2015/0334484 A1 | 11/2015 | Usher et al. |
| 2016/0019907 A1 | 1/2016 | Buck et al. |
| 2016/0088391 A1 | 3/2016 | Usher et al. |
| 2016/0098921 A1 | 4/2016 | Qutub et al. |
| 2016/0162469 A1 | 6/2016 | Santos |
| 2016/0165361 A1 | 6/2016 | Miller et al. |
| 2016/0189220 A1 | 6/2016 | Verma |
| 2016/0196818 A1 | 7/2016 | Christoph |
| 2016/0196838 A1 | 7/2016 | Rossum et al. |
| 2016/0210051 A1 | 7/2016 | Qutub et al. |
| 2016/0241948 A1 | 8/2016 | Liu et al. |
| 2016/0267899 A1 | 9/2016 | Gauger, Jr. et al. |
| 2017/0214800 A1 | 7/2017 | Nagai |
| 2017/0263267 A1 | 9/2017 | Dusan et al. |

FOREIGN PATENT DOCUMENTS

| | | |
|---|---|---|
| EP | 3007170 A1 | 4/2016 |
| WO | 2009132646 A1 | 11/2009 |
| WO | 201694418 A1 | 6/2016 |
| WO | 2016089745 A1 | 6/2016 |

OTHER PUBLICATIONS

International Search Report and Written Opinion in application No. PCT/US2018/023136 dated Jul. 26, 2018.

International Search Report and Written Opinion in application No. PCT/US2018/035040 dated Aug. 27, 2018.

International Search Report and Written Opinion in PCT/US2018/023072 dated Jun. 6, 2018.

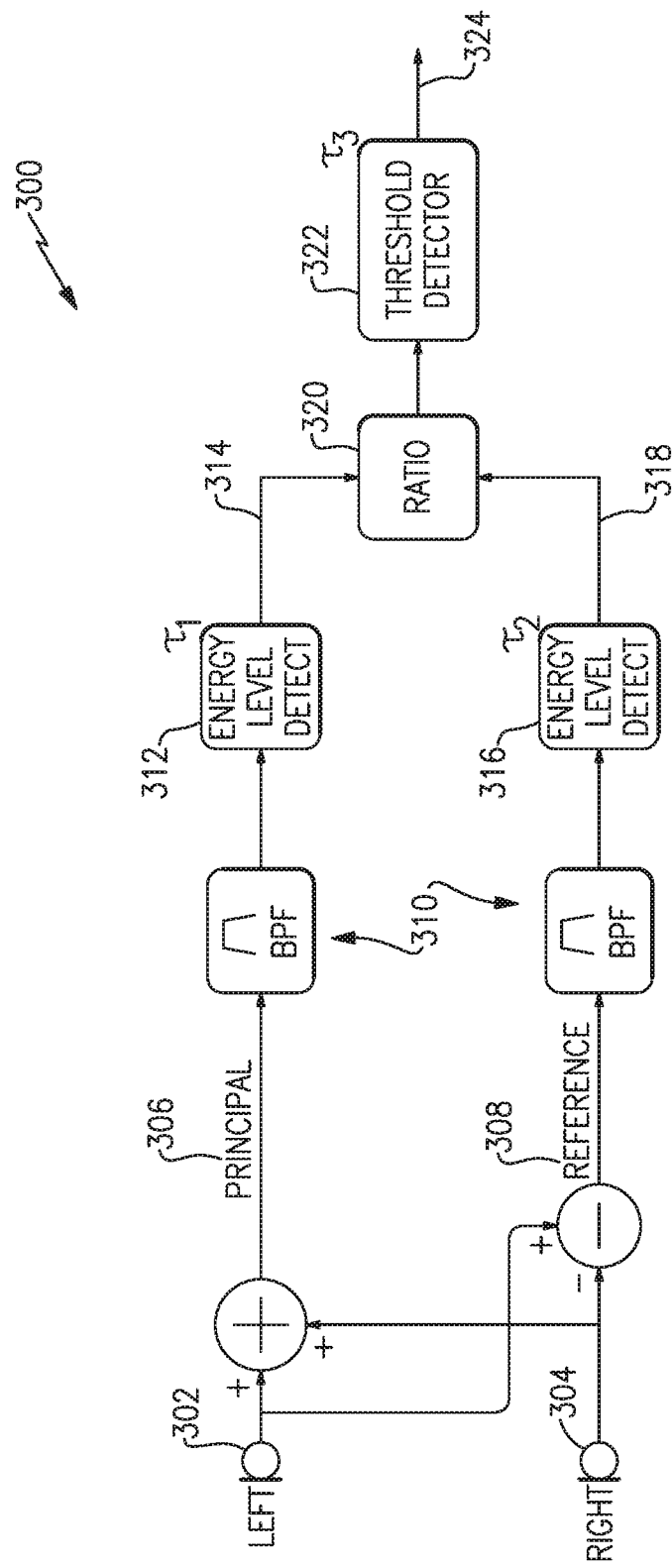

VOICE ACTIVITY DETECTION FOR COMMUNICATION HEADSET

BACKGROUND

Earphone and headset systems are used in numerous environments and for various purposes, examples of which include entertainment purposes such as gaming or listening to music, productive purposes such as electronic communications and phone calls, and professional purposes such as aviation communications or sound studio monitoring, to name a few. Different environments and purposes may have different requirements for fidelity, noise isolation, noise reduction, voice pick-up, and the like. In some environments or in some applications it may be desirable to detect when the user of the headphones or headset is actively speaking.

SUMMARY OF THE INVENTION

Aspects and examples are directed to communication headsets and methods that detect voice activity of a user. The systems and methods operate to detect when a user is actively speaking, while ignoring audible sounds that are not due to the user speaking, such as other speakers or background noise. Detection of voice activity by the user may be beneficially applied to further functions or operational characteristics. For example, detecting voice activity by the user may be used to cue an audio recording, to cue a voice recognition system, activate a virtual personal assistant (VPA), trigger automatic gain control (AGC), acoustic echo processing or cancellation, noise suppression, sidetone gain adjustment, or other voice operated switch (VOX) applications.

Aspects and examples disclosed herein target speech activity to the front of a headset and at a close distance, such as near the user's mouth, while attempting to reject speech activity of another person in conversation with the user, who also may be in front of the headset but further away, i.e., a conversational distance. In some examples, the headset may process the detected speech activity of the user and compare it to surrounding sounds to determine whether the user is speaking loud enough for others to hear. In some examples, the headset may process other sounds and/or the speech activity of a conversational partner to reduce or enhance them in the hearing of the user, as appropriate or as desired by the user. Aspects and examples disclosed herein may improve headset use and reduce false-triggering by noise or other people talking by targeting voice activity detection of the wearer of the headset.

According to an aspect, a method is provided for determining that a headset user is speaking, and the method includes receiving a first signal from a first microphone and receiving a second signal from a second microphone, providing a principal signal from a sum of the first signal and the second signal, providing a reference signal from a difference between the first signal and the second signal, limiting a rate of change of at least one of the principal signal or the reference signal by a time constant, comparing the principal signal to the reference signal, and selectively indicating that a user is speaking based at least in part upon the comparison.

Some examples include comparing whether the principal signal exceeds the reference signal by a threshold. Some examples include comparing a power content of each of the principal signal and the reference signal.

Certain examples include comparing a level at which the user is speaking to an appropriate level to be audible over background noise. The method may further include providing an indication to the user of whether the user is speaking at the appropriate level.

Some examples include band filtering at least one of the first signal, the second signal, the principal signal, and the reference signal.

In some examples, the time constant may be in a range of 0.2 seconds to 1.2 seconds. In some examples, the time constant is a first time constant applied to the principal signal. Some examples include limiting a rate of change of the reference signal by a second time constant. In certain examples, the second time constant is longer than the first time constant.

According to another aspect, a communication headset is provided and includes a left microphone associated with a left earpiece to provide a left signal, a right microphone associated with a right earpiece to provide a right signal, and a detection circuit coupled to the left and right microphones. The detection circuit is configured to determine a principal signal from an addition of the left and right signals, determine a reference signal from a difference between the left and right signals, limit a rate of change of at least one of the principal signal and the reference signal by a time constant, compare the principal signal to the reference signal, and selectively indicate that the user is speaking based at least in part upon the comparison.

In some examples, the detection circuit indicates the user is speaking when the principal signal exceeds the reference signal by a threshold. In some examples, the detection circuit compares the principal signal to the reference signal by comparing a power content of each of the principal signal and the reference signal.

In some examples, each of the principal signal and the reference signal is band filtered.

In some examples, the time constant is in a range of 0.2 seconds to 1.2 seconds. The time constant may be a first time constant applied to the principal signal. The detection circuit may also limit a rate of change of the reference signal by a second time constant. The second time constant may be longer than the first time constant In certain examples, the detection circuit also compares a level at which the user is speaking to an appropriate level of speech to be audible over background noise. The detection circuit may also provide an indication to the user of whether the user is speaking at the appropriate level.

According to yet another embodiment, a non-transitory computer readable medium is provided that has instructions encoded therein that, when processed by a suitable processor, cause the processor to perform a method that includes receiving a first signal from a first microphone, receiving a second signal from a second microphone, providing a principal signal from a sum of the first signal and the second signal, providing a reference signal from a difference between the first signal and the second signal, limiting a rate of change of at least one of the principal signal or the reference signal by a time constant, comparing the principal signal to the reference signal, and selectively indicating that a user is speaking based at least in part upon the comparison.

In some examples, comparing the principal signal to the reference signal includes comparing whether the principal signal exceeds the reference signal by a threshold. Comparing the principal signal to the reference signal may include comparing a power content of each of the principal signal and the reference signal.

Certain examples include instructions for comparing a level at which the user is speaking to an appropriate speech level, and may include instructions for indicating whether the user is speaking at the appropriate speech level.

Some examples include instructions for band filtering at least one of the first signal, the second signal, the principal signal, and the reference signal.

In some examples, the time constant is a first time constant applied to the principal signal. Instructions may be included for limiting a rate of change of the reference signal by a second time constant. The second time constant may be longer than the first time constant.

Still other aspects, examples, and advantages of these exemplary aspects and examples are discussed in detail below. Examples disclosed herein may be combined with other examples in any manner consistent with at least one of the principles disclosed herein, and references to "an example," "some examples," "an alternate example," "various examples," "one example" or the like are not necessarily mutually exclusive and are intended to indicate that a particular feature, structure, or characteristic described may be included in at least one example. The appearances of such terms herein are not necessarily all referring to the same example.

BRIEF DESCRIPTION OF THE DRAWINGS

Various aspects of at least one example are discussed below with reference to the accompanying figures, which are not intended to be drawn to scale. The figures are included to provide illustration and a further understanding of the various aspects and examples, and are incorporated in and constitute a part of this specification, but are not intended as a definition of the limits of the invention. In the figures, identical or nearly identical components illustrated in various figures may be represented by a like numeral. For purposes of clarity, not every component may be labeled in every figure. In the figures:

FIG. 3 is a flow chart of an example method to process signals to detect voice activity.

DETAILED DESCRIPTION

Figure 1:
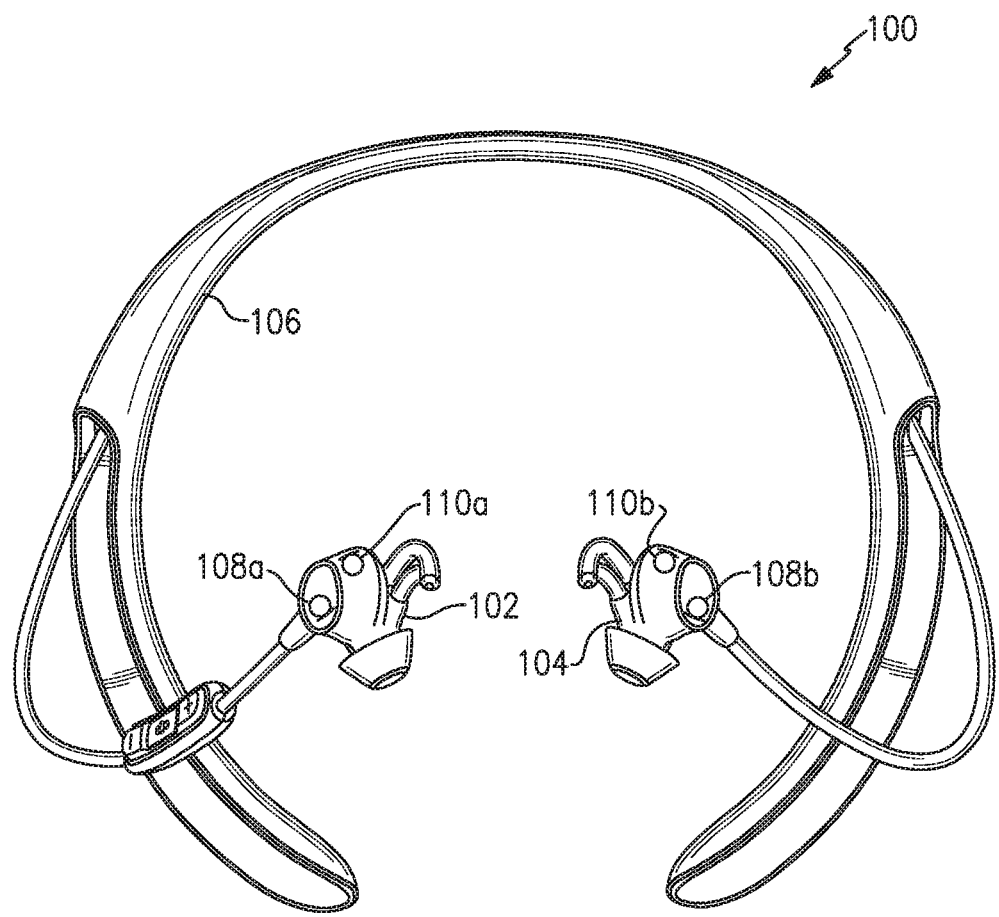
FIG. 1 is a perspective view of a headset.

Aspects of the present disclosure are directed to communication headsets and methods that detect voice activity by the user (e.g., wearer) of a headset. Such detection may enhance voice activated features or functions available as part of the headset or other associated equipment, such as a cellular telephone or audio processing system. Examples disclosed herein may be coupled to, or placed in connection with, other systems, through wired or wireless means, or may be independent of any other systems or equipment.

The communication headset disclosed herein may include, in some examples, an aviation headset, a telephone headset, media headphones, network gaming headphones, hearing assistance headphones, hearing aids, or any combination of these or others. Throughout this disclosure the terms "headset," "headphone," "earphone," and "headphone set" are used interchangeably, and no distinction is meant to be made by the use of one term over another unless the context clearly indicates otherwise. Additionally, aspects and examples in accord with those disclosed herein, in some circumstances, are applied to earphone form factors (e.g., in-ear transducers, earbuds), and are therefore also contemplated by the terms "headset," "headphone," and "headphone set." Advantages of some examples disclosed herein include low power consumption while monitoring for user voice activity, high accuracy of detecting the user's voice, and rejection of voice activity of others.

Examples disclosed herein may be combined with other examples in any manner consistent with at least one of the principles disclosed herein, and references to "an example," "some examples," "an alternate example," "various examples," "one example" or the like are not necessarily mutually exclusive and are intended to indicate that a particular feature, structure, or characteristic described may be included in at least one example. The appearances of such terms herein are not necessarily all referring to the same example.

It is to be appreciated that examples of the methods and apparatuses discussed herein are not limited in application to the details of construction and the arrangement of components set forth in the following description or illustrated in the accompanying drawings. The methods and apparatuses are capable of implementation in other examples and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

FIG. 1 illustrates one example of a headset 100. The headset 100 includes two earpieces, e.g., a right earphone 102 and a left earphone 104, coupled to and intercoupled by a neckband 106, to be worn around a user's neck. Each of the earphones 102, 104 include one or more microphones, such as one or more front microphones 108 and one or more rear microphones 110. In some examples, one or more interior microphones may be included in the interior of the right earphone 102 or left earphone 104, and either earphone may have multiple interior microphones, or neither earphone may have an interior microphone. Various examples may have more or fewer front microphones 108 and may have more, fewer, or no rear microphones 110.

Figure 2:
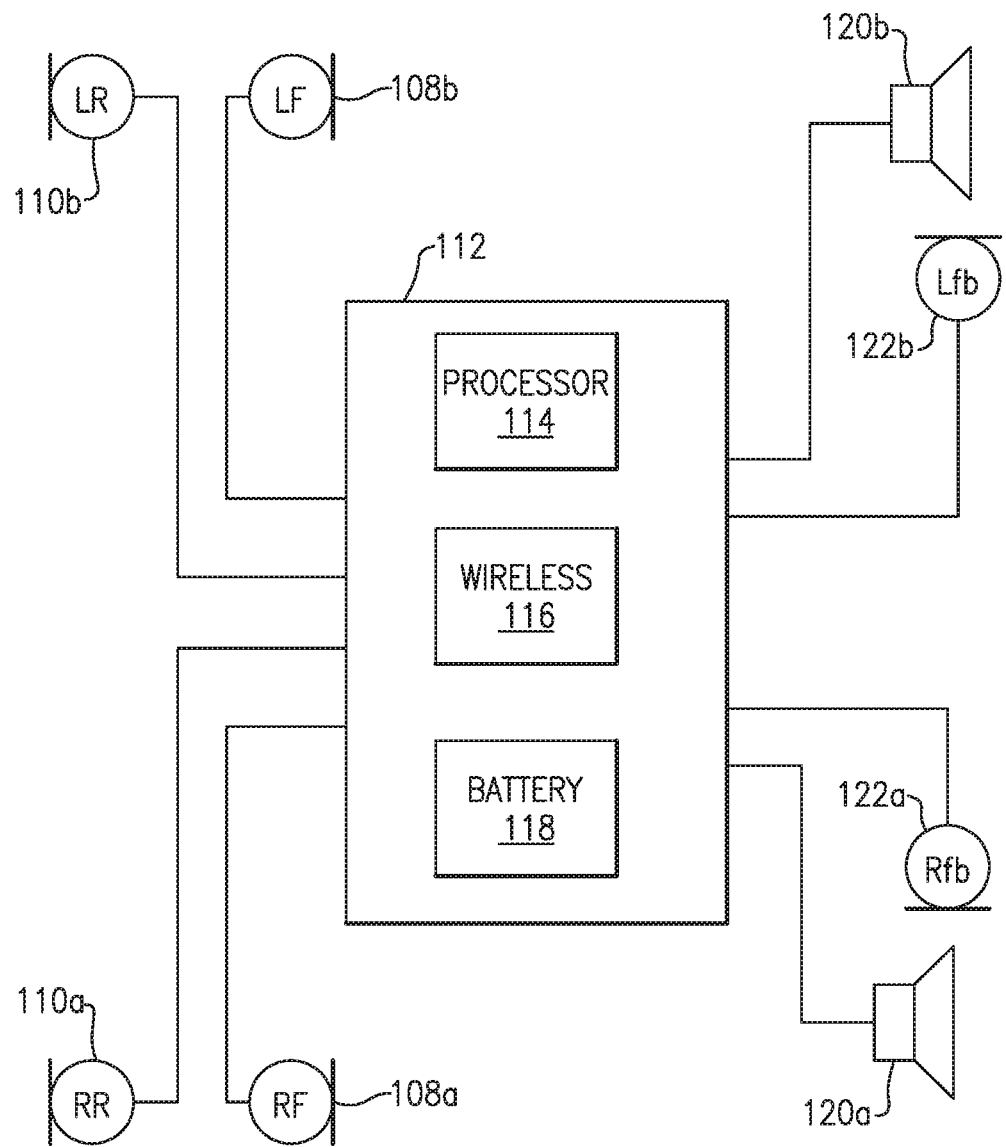
FIG. 2 is a schematic diagram of an example audio processing system that may be incorporated in the headset of FIG. 1.

Shown in FIG. 2 is an example of a central processing unit 112 that may be physically housed somewhere on or within the headset 100, such as in the neckband 106. The central processing unit 112 includes a processor 114, wireless communications system 116, and battery 118. FIG. 2 also shows speakers 120, associated with each earphone 102, 104, and internal microphones 122 that may be used for feedback-based active noise reduction (sometimes called feedback microphones) or other purposes.

The various microphones may serve multiple purposes. Microphone output signals may provide indications of ambient sound to be cancelled in feed-forward noise cancellation, as ambient sound (including the voice of a local conversation partner) to be enhanced for conversation assistance, as voice sounds to be transmitted to a remote conversation partner through the wireless communications system, and/or as side-tone voice sounds to play back for the user to hear his own voice while speaking. In the example of FIG. 1, the four microphones 108, 110 are arranged with the front microphone 108 on each ear pointing generally forward, and the rear microphone 110 on each ear pointing generally rearward. The earphones and microphones may be arranged to point their respective pairs of microphones slightly inward when worn, to be more responsive to the user's voice and/or a conversational partner.

The processor 114 may apply a number of configurable filters to the signals from the various microphones. The provision of a high-bandwidth communication channel from all four microphones 108a, 110a, 108b, 110b, two located at each ear, to a shared processing system provides opportunity for local conversation assistance and communication with a remote person or system. Specifically, a set of filters may advantageously use the microphones' physical arrangement, and combine the four microphone signals to form a near-field array optimized for detecting the user's own voice, such that the sensitivity of the array to signals originating from the user's mouth is greater than the sensitivity to sounds originating farther from the headset, or from other directions.

Aspects and examples disclosed herein are directed to detecting when the user is speaking, and may be referred to herein as voice activity detection (VAD). Such may be accomplished with less processing than may be required for picking up or enhancing the user's voice among an environmental acoustic field, and examples disclosed herein are generally directed to comparing the energy of a signal that includes the user's voice (i.e., acoustic energy coming from the vicinity of the user's mouth) to the energy of a signal with a reduced response to the user's voice (e.g., acoustic energy in the remainder of the environment), to detect whether a user is speaking or not.

While the reference numerals 108, 110, and 122 are used to refer to one or more microphones, the visual elements illustrated in the figures may, in some examples, represent an acoustic port wherein acoustic signals enter to ultimately reach the microphones 108, 110, 122, which may be internal and not physically visible from the exterior. In examples, one or more of the microphones 108, 110, 122 may be immediately adjacent to the interior of an acoustic port, or may be removed from an acoustic port by a distance, and may include an acoustic waveguide between an acoustic port and an associated microphone.

While the example headset 100 is shown with earpieces in the form of earphones 102, 104, in other examples cushions may sit on or over the ear, or a headset in accord with systems and methods disclosed herein may include alternate physical arrangements. Additionally, although the example headset 100 illustrated in FIG. 1 includes a neckband 106, other examples may include different support structures or no support structure.

Various microphone signals will be processed in various ways to detect whether a user of the headset 100, i.e., a person wearing the headset, is actively speaking. As stated above, detection of a user speaking will sometimes be referred to as voice activity detection (VAD). As used herein, the terms "voice," "speech," "talk," and variations thereof are used interchangeably and without regard for whether such speech involves use of the vocal folds.

Examples disclosed herein to detect user voice activity may operate or rely on various principles of the environment, acoustics, vocal characteristics, and unique aspects of use, e.g., an earpiece worn or placed on each side of the head of a user whose voice activity is to be detected. For example, in a headset environment, a user's voice generally originates at a point symmetric to the left and right sides of the headset and will arrive at both a right front microphone and a left front microphone with substantially the same amplitude at substantially the same time and substantially the same phase, whereas background noise and vocalizations of other people will tend to be asymmetrical between the left and right, having variation in amplitude, phase, and time. Various spectral characteristics can also play a beneficial role in detecting a user's voice activity.

FIG. 3 illustrates a system and method 300 of processing microphone signals to detect a likelihood that a headset user is actively speaking. The example system and method 300 shown in FIG. 3 relies on processing and comparing characteristics of binaural, i.e., left and right, signals. As discussed above, left and right vocal signals due to the user's voice are substantially symmetric with each other and may be substantially identical due to the substantially equidistant position of left and right microphones from the user's mouth. The method of FIG. 3 processes a left signal 302 and a right signal 304 by adding them together to provide a principal signal 306. The method of FIG. 3 also processes the left signal 302 and the right signal 304 by subtracting them to provide a reference signal 308.

The left and right signals 302, 304 are each provided by, and received from, microphones on the left and right sides of the headset, respectively, and may be associated with earphones, such as in the example headset 100 of FIG. 1, or other structural components such as left and right portions of the neckband 106, or earcups of an over-the-ear or on-the-ear headset, or the like, and may come from multiple microphones on each side. For example, a left side may have one microphone or may have multiple microphones, as discussed above, and the left signal 302 may be provided by a single microphone on the left side or may be a combination of signals from multiple microphones on the left side. In the case of multiple microphones on the left side, the left signal 302 may be provided from a steered beam formed by processing the multiple microphones, e.g., as a phased array, or may be a simple combination (e.g., addition) of signals from the multiple microphones, or may be provided through other signal processing. Similarly, the right signal 304 may be provided by a single microphone, a combination of multiple microphones, or an array of microphones, all on the right side.

As discussed above, the left signal 302 and the right signal 304 are added together to provide a principal signal 306, and the right signal 304 is subtracted from the left signal 302 to provide a reference signal 308. Alternatively the left signal 302 may instead be subtracted from the right signal 304 to provide the reference signal 308. If the user of the headset is talking, the user's voice will be substantially equal in both the left signal 302 and the right signal 304. Accordingly, the left signal 302 and the right signal 304 constructively combine in the principal signal 306. In the reference signal 308, however, the user's voice may substantially cancel itself out in the subtraction, i.e., destructively interferes with itself. Accordingly, when the user is talking, the principal signal 306 will include a user voice component with approximately double the signal energy of either of the left signal 302 or the right signal 304 individually; while the reference signal 308 will have substantially no component from the user's voice. This allows a comparison of the principal signal 306 and the reference signal 308 to provide an indication whether the user is talking.

Components of the left signal 302 and the right signal 304 that are not associated with the user's voice are unlikely to be symmetric between the left and right sides and will tend neither to reinforce nor interfere with each other, whether added or subtracted. In this manner, the principal signal 306 and the reference signal 308 will have approximately the same signal energy for components that are not associated with the user's voice. For example, signal components from surrounding noise, other talkers at a distance, and other talkers not equidistant from the left and right sides, even if nearby, will be of substantially the same signal energy in the principal signal 306 and the reference signal 308. The reference signal 308 therefore substantially provides a reference of the surrounding acoustic energy not including the user's voice, whereas the principal signal 306 may provide similar components of surrounding acoustic energy but further including the user's voice when the user is talking. Accordingly, if the principal signal 306 has sufficiently more signal energy than the reference signal 308, it may be concluded that the user is talking.

With continued reference to FIG. 3, each of the principal signal 306 and the reference signal 308 are processed through a band pass filter 310 to retain a frequency range including a typical human vocal range. For example, the band pass filters 310 may substantially remove frequency components outside the range of approximately 60 Hz to 4,000 Hz. In some examples, the band pass filters 310 may pass frequencies in the range of 100 Hz to 1,800 Hz. In other examples, the band pass filters 310 may pass frequencies in the range of 250 Hz to 900 Hz. Various examples may include differing frequency ranges to accommodate varying operational parameters or environments.

The principal signal 306, after filtering, is provided to and received by a level detector 312 that measures an energy level of the filtered principal signal. The energy level may be measured with a certain time constant, $\tau_1$, to generate a principal power signal 314 that is a slowly-changing indicator of average energy/power content of the principal signal 306. Similarly, the reference signal 308, after filtering, is provided to and received by a level detector 316 that measures an energy level of the filtered reference signal. This energy level may be measured with a time constant, $\tau_2$, to generate a reference power signal 318 that is a slowly-changing indicator of average energy/power content of the reference signal 308. Background and environmental noise tends to change less quickly than do fluctuations in speech. Accordingly, the time constant, $\tau_1$, for the principal level detector 312 (including speech) may be shorter than the time constant, $\tau_2$, associated with the reference level detector 316 (substantially without speech). In some examples, the principal time constant, $\tau_1$, and the reference time constant, $\tau_2$, may be approximately the same. In some examples, the principal time constant, $\tau_1$, may be in the range of 0.1 to 1.0 seconds, or in a range of 0.2 to 0.6 seconds, and the reference time constant, $\tau_2$, may be in the range of 0.2 to 3.0 seconds, or in a range of 0.4 to 2.0 seconds. In a certain example, the principal time constant, $\tau_1$, may be approximately 0.25 seconds and the reference time constant, $\tau_2$, may be approximately 1 second. Application of time constants, as disclosed herein, may provide increased accuracy, at least in part by preventing sudden changes in the acoustic environment, or brief pauses in the user's speech, and the like, from causing erroneous indications. In some examples, the time constants may fluctuate based upon whether a signal is increasing in energy or decreasing in energy. For example, to accurately indicate a change, either or both of the level detectors 312, 316, may apply a shorter time constant (faster, more responsive) when its received signal level increases (e.g., the "attack" of a waveform). Conversely, either or both of the level detectors 312, 316, may apply a longer time constant (slower, less responsive) when its received signal level decreases (e.g., the "decay" of a waveform). Ultimately, the level detectors 312, 316 acting upon each of the principal signal 306 and the reference signal 308, respectively, provide a principal power signal 314 and a reference power signal 318, also respectively.

In certain examples, the principal signal 306 may be directly compared to the reference signal 308, and if the principal signal 306 has larger amplitude a conclusion is made that the user is talking. In other examples, the principal power signal 314 and the reference power signal 318 are directly compared, and a determination that the user is talking is made if the principal power signal 314 has larger amplitude. At least one example of making a comparison of two signals is by taking a ratio of the two signals. Accordingly, the system and method 300 of FIG. 3 provides the principal power signal 314 and the reference power signal 318 to a ratio block 320 configured to calculate a ratio between the two signals. In certain examples, a threshold is applied to require a minimum signal differential, to provide a confidence level that the user is in fact talking.

In the example system and method 300 shown in FIG. 3, a threshold is applied by a threshold detector 322. For example, a certain confidence level may be had that the user is talking if the principal power signal 314 is at least 8% higher than the reference power signal 318, and in such case the threshold ratio enforced by the threshold detector 322 may be 1.08. The threshold detector 322 indicates at an output 324 if the ratio of the principal power signal 314 to the reference power signal 318 satisfies the threshold ratio. The indication at the output 324 may be referred to as a flag, e.g., a binary indicator that indicates either a determination that the user is talking (that the principal signal exceeds the reference signal by the threshold amount) or that the user is not talking. Accordingly, the output 324 may be a digital output represented as either a 1 or 0, and may be called a VAD flag. Various confidence levels may be selected via selection of the threshold value. For example, in various examples, the threshold value may include any value in a range of 2% to 30% or more. Accordingly, various examples test whether the principal power signal 314 is greater than the reference power signal 318 by, e.g., 2% to 30%, via operation of the threshold detector 322 for a certain threshold ratio, e.g., from 1.02 to 1.30. The threshold ratio may be programmed into the threshold detector 322, may be user selectable by a technician, or may be adjustable or otherwise "tunable" by a user.

In other examples, the reference power signal 318 may be multiplied by a threshold ratio and the result compared directly to the principal power signal 314. Such may be advantageous in that multiplication of the reference power signal 318 may be more easily accomplished than calculation of a ratio of two signals. In alternate examples, the principal power signal 314 may be multiplied by a threshold value less than unity, rather than, or in addition to, the reference power signal 318 being multiplied by a threshold value greater than unity. For example, a principal-to-reference ratio of 1.08 (i.e., and 8% threshold) may be determined, or measured, by multiplying the reference power signal 318 by 1.08 and comparing the result directly to the principal power signal 314. Conversely, the principal power signal 314 may be multiplied by 0.926 (the inverse of 1.08) and the result may be compared directly to the reference power signal 318.

A further time constant, $\tau_3$, may be applied at the ratio block 320, at the threshold detector 322, at the output 324, or elsewhere, including at a further system or in further processing that receives the VAD flag from the output 324.

The time constant, $\tau_3$, smooths the VAD flag and prevents the VAD flag from changing during a brief change in the ratio of the principal signal 306 to the reference signal 308. For example, a pause in the user's speech should not necessarily cause the VAD flag to indicate that the user is no longer speaking, and application of the time constant, $\tau_3$, ensures that a change persists some minimum amount of time before the VAD flag reflects such a change. In various examples, the time constant, $\tau_3$, may be in a range of 0.1 to 5.0 seconds, or may be in a range of 0.2 to 3.0 seconds. In at least one example, the time constant, $\tau_3$, may be 0.5 seconds. In certain examples, the time constant, $\tau_3$, may be applied with different values based upon whether an indicated change is from a talking state to a not talking state, or from a not talking state to a talking state. For example, if the VAD flag indicates that the user is not speaking, and a change in signal levels indicates that the user started speaking, the time constant, $\tau_3$, may be set to a shorter time period for such a transition than when the transition is in an opposite direction. Accordingly, a user starting to speak, when he/she wasn't previously speaking, may be more quickly indicated at the output 324. Whereas a longer time constant, $\tau_3$, may be applied when the user stops speaking after having been actively speaking, thus delaying the indication of a change to produce a higher confidence level that the user has indeed stopped speaking.

In certain examples, a method of processing microphone signals to detect a likelihood that a headset user is actively speaking, or is speaking clearly or loudly enough for intelligibility, may include further band filtering or sub-band processing. For example, any of the signals in the example system and method 300 may be separated into frequency sub-bands, and one or more of the frequency sub-bands may be separately processed by, e.g., across multiple sub-methods of the example system and method 300. For example, in at least one example that includes sub-band processing, each of the principal and reference signals 306, 308 may be filtered into octave bands centered at, for example, 250, 500, 1000, 2000, and 4000 Hz (or others) and each octave band provided to a level detector similar to the level detectors 312, 316. The decibel levels of the various octave bands may be analyzed or adjusted to determine whether a user is likely speaking, and further may be analyzed to determine whether a user is speaking loudly enough across different regions of the spectrum to be heard and understood amidst the environmental or background noise.

Some examples may further process one or more speech-to-noise ratios, such as the speech-to-noise ratios among octave bands discussed above, to estimate a speech transmission index (STI), which is a fractional decimal number from 0 to 1 that correlates to speech intelligibility. In some examples, the processor 114 may be configured to determine whether a user is speaking clearly and/or loudly enough to be heard over the ambient noise, and may indicate to the user to speak more loudly or to speak more softly, as appropriate. For example, the processor 114 may control or communicate with other components to produce an audible, visible, or tactile indication, such as sounds through the earphones, flashing lights, or vibration of an earphone or the neckband, or by communication via external interfaces to, e.g., a user's smartphone or watch.

The system and method 300 of FIG. 3 discussed above is an example method of detecting a user's voice activity based on processing and comparison of binaural, i.e., left and right, input signals. In certain examples, a system and method to detect a user's voice activity involves a front signal and a rear signal rather than a left signal and a right signal, to compare the relative acoustic power from front to rear to determine whether a user is speaking. When a user wearing a headset speaks, acoustic energy from the user's voice will reach a front microphone (on either side, e.g., the left earphone or the right earphone) with greater intensity than it reaches a rear microphone.

Many factors influence the difference in acoustic intensity reaching a front microphone versus a rear microphone. For example, the rear microphone is farther away from the user's mouth, yet both microphones are located in a near-field region of the user's mouth, causing distance variation to have greater effect as the acoustic intensity decays proportional to distance cubed. Acoustic energy from background noise and other talkers, however, will tend to have substantially the same acoustic intensity arriving at the front and rear microphones, and therefore a difference in signal energy between the front and rear may indicate that a user is speaking. The example system and method 300 may accordingly be modified to compare a front signal to a rear signal, instead of a principal signal (e.g., 306) to a reference signal (e.g., 308), respectively.

One or more of the above described methods, examples, and combinations, may be used to detect that a headset user is actively talking, e.g., to provide voice activity detection. Any of the methods described may be implemented with varying levels of reliability based on, e.g., microphone quality, microphone placement, acoustic ports, headset or earphone frame design, threshold values, selection of smoothing time constants, weighting factors, window sizes, etc., as well as other criteria that may accommodate varying applications and operational parameters. Any example of the methods described above may be sufficient to adequately detect a user's voice activity for certain applications. Improved detection may be achieved, however, by combining the output of methods and examples described above with other detection methods through various combinatorial logic, to incorporate concurrence and/or confidence level among multiple methods or approaches. Multiple variations of combinatorial logic, number and types of microphones, number and types of detectors, threshold values, filters, etc. are contemplated by examples in accord with systems and methods disclosed herein.

It is to be understood that any of the functions of the system and method 300, or similar, may be implemented or carried out in a digital signal processor (DSP), a microprocessor, a logic controller, logic circuits, and the like, or any combination of these, and may include analog circuit components and/or other components with respect to any particular implementation. Functions and components disclosed herein may operate in the digital domain and certain examples include analog-to-digital (ADC) conversion of analog signals generated by microphones, despite the lack of illustration of ADC's in the various figures. Such ADC functionality may be incorporated in or otherwise internal to a signal processor. Any suitable hardware and/or software, including firmware and the like, may be configured to carry out or implement components of the aspects and examples disclosed herein, and various implementations of aspects and examples may include components and/or functionality in addition to those disclosed.

Having described above several aspects of at least one example, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A method of determining that a headset user is speaking, the method comprising:
   receiving a first signal from a first microphone;
   receiving a second signal from a second microphone;
   adding the first signal and the second signal, by a processor, to generate a principal signal;
   subtracting, by the processor, one of the first signal and the second signal from the other of the first signal and the second signal to generate a reference signal;
   limiting a rate of change, by the processor, of at least one of the principal signal or the reference signal by a time constant;
   comparing the principal signal to the reference signal, by the processor, to determine whether the principal signal exceeds the reference signal by a threshold amount;
   selectively indicating that the user is speaking, responsive to determining that the principal signal exceeds the reference signal by the threshold amount; and
   activating a voice operated control in response to selectively indicating that the user is speaking.

2. The method of claim 1 further comprising comparing a level at which the user is speaking to an appropriate level to be audible over a background noise.

3. The method of claim 2 further comprising providing an indication to the user of whether the user is speaking at the appropriate level.

4. The method of claim 1 further comprising band filtering at least one of the first signal, the second signal, the principal signal, and the reference signal.

5. The method of claim 1 wherein the time constant is a first time constant applied to the principal signal and further comprising limiting a rate of change of the reference signal by a second time constant.

6. The method of claim 5 wherein the second time constant is longer than the first time constant.

7. A communication headset, comprising:
   a left microphone associated with a left earpiece to provide a left signal;
   a right microphone associated with a right earpiece to provide a right signal; and
   a detection circuit coupled to the left and right microphones and configured to:
      add the left and right signals to determine a principal signal,
      take a difference between the left and right signals to determine a reference signal,
      limit a rate of change of at least one of the principal signal and the reference signal by a time constant,
      compare the principal signal to the reference signal to determine whether the principal signal exceeds the reference signal by a threshold amount, and
      selectively indicate to a voice operated component that the user is speaking based at least in part upon the determination that the principal signal exceeds the reference signal by the threshold amount.

8. The communication headset of claim 7 wherein each of the principal signal and the reference signal is band filtered.

9. The communication headset of claim 7 wherein the detection circuit is further configured to compare a level at which the user is speaking to an appropriate level of speech to be audible over a background noise.

10. The communication headset of claim 9 wherein the detection circuit is further configured to provide an indication to the user of whether the user is speaking at the appropriate level.

11. The communication headset of claim 7 wherein the time constant is a first time constant applied to the principal signal and the detection circuit is further configured to limit a rate of change of the reference signal by a second time constant.

12. The communication headset of claim 11 wherein the second time constant is longer than the first time constant.

13. A non-transitory computer readable medium having instructions encoded therein that, when processed by a suitable processor, cause the processor to perform a method comprising:
   receiving a first signal from a first microphone;
   receiving a second signal from a second microphone;
   adding the first signal and the second signal to generate a principal signal;
   taking a difference between the first signal and the second signal to generate a reference signal;
   limiting a rate of change of at least one of the principal signal or the reference signal by a time constant;
   comparing the principal signal to the reference signal to determine whether the principal signal exceeds the reference signal by a threshold amount;
   selectively indicating that a user is speaking, responsive to determining that the principal signal exceeds the reference signal by the threshold amount; and
   activating a voice operated control in response to selectively indicating that the user is speaking.

14. The non-transitory computer readable medium of claim 13 further comprising instructions for comparing a level at which the user is speaking to an appropriate speech level and for indicating whether the user is speaking at the appropriate speech level.

15. The non-transitory computer readable medium of claim 13 further comprising instructions for band filtering at least one of the first signal, the second signal, the principal signal, and the reference signal.

16. The non-transitory computer readable medium of claim 13 wherein the time constant is a first time constant applied to the principal signal and further comprising limiting a rate of change of the reference signal by a second time constant.

17. The non-transitory computer readable medium of claim 16 wherein the second time constant is longer than the first time constant.

18. The method of claim 1 wherein the voice operated control includes at least one of cueing an audio recording, cueing a voice recognition system, activating a virtual personal assistant, triggering an automatic gain control, adjusting an echo processing or cancellation, adjusting a noise processing, cancellation, or suppression, and adjusting a sidetone gain.

19. The communication headset of claim 7 wherein the voice operated component is configured to perform at least one of cueing an audio recording, cueing a voice recognition system, activating a virtual personal assistant, triggering an automatic gain control, adjusting an echo processing or cancellation, adjusting a noise processing, cancellation, or suppression, and adjusting a sidetone gain.

20. The non-transitory computer readable medium of claim 13 wherein the voice operated control includes at least one of cueing an audio recording, cueing a voice recognition system, activating a virtual personal assistant, triggering an automatic gain control, adjusting an echo processing or cancellation, adjusting a noise processing, cancellation, or suppression, and adjusting a sidetone gain.

\* \* \* \* \*